(No Model.)  
P. T. NEUMANN.  
TRACTION ENGINE.
No. 479,832. Patented Aug. 2, 1892.
2 Sheets—Sheet 2.
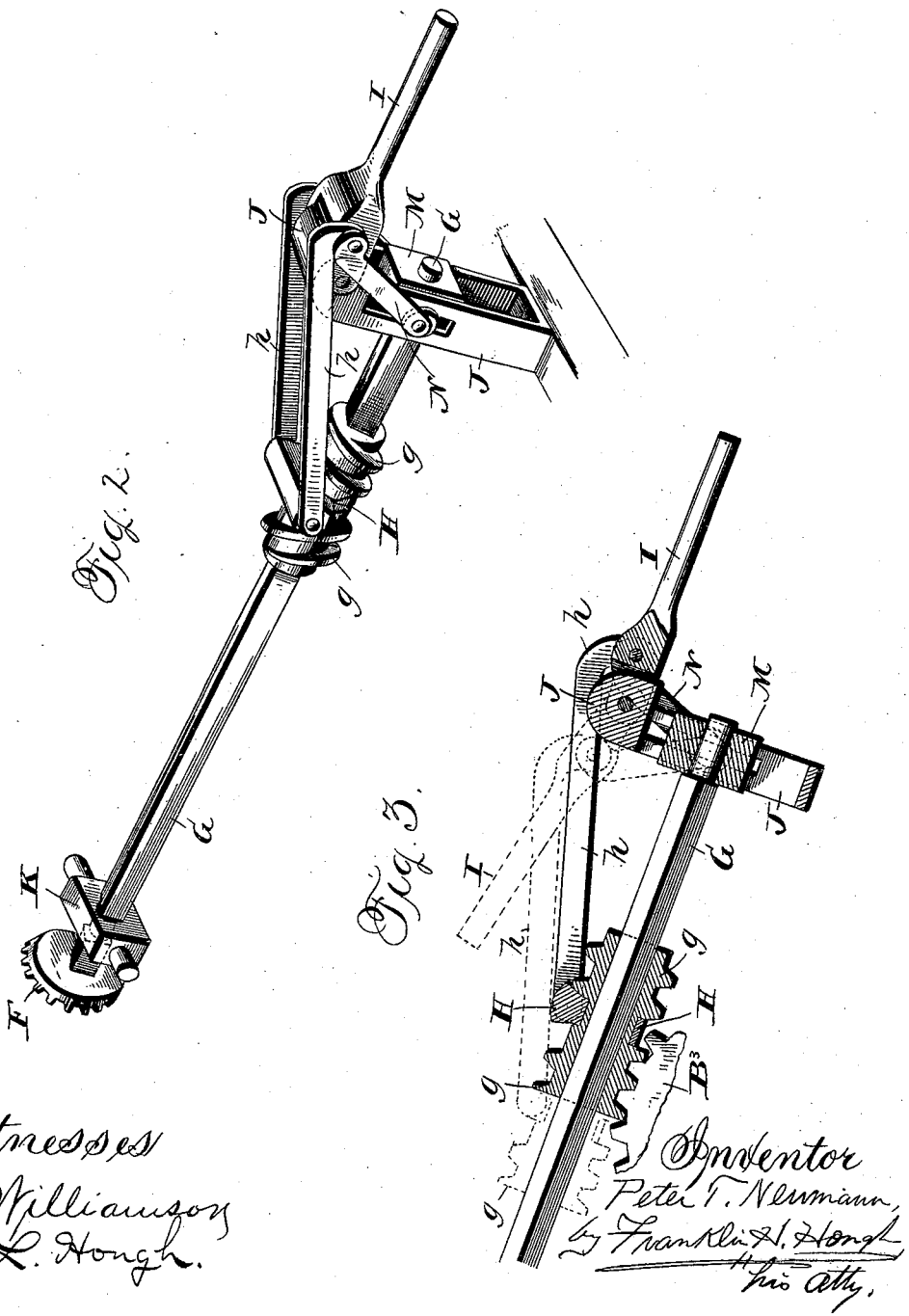

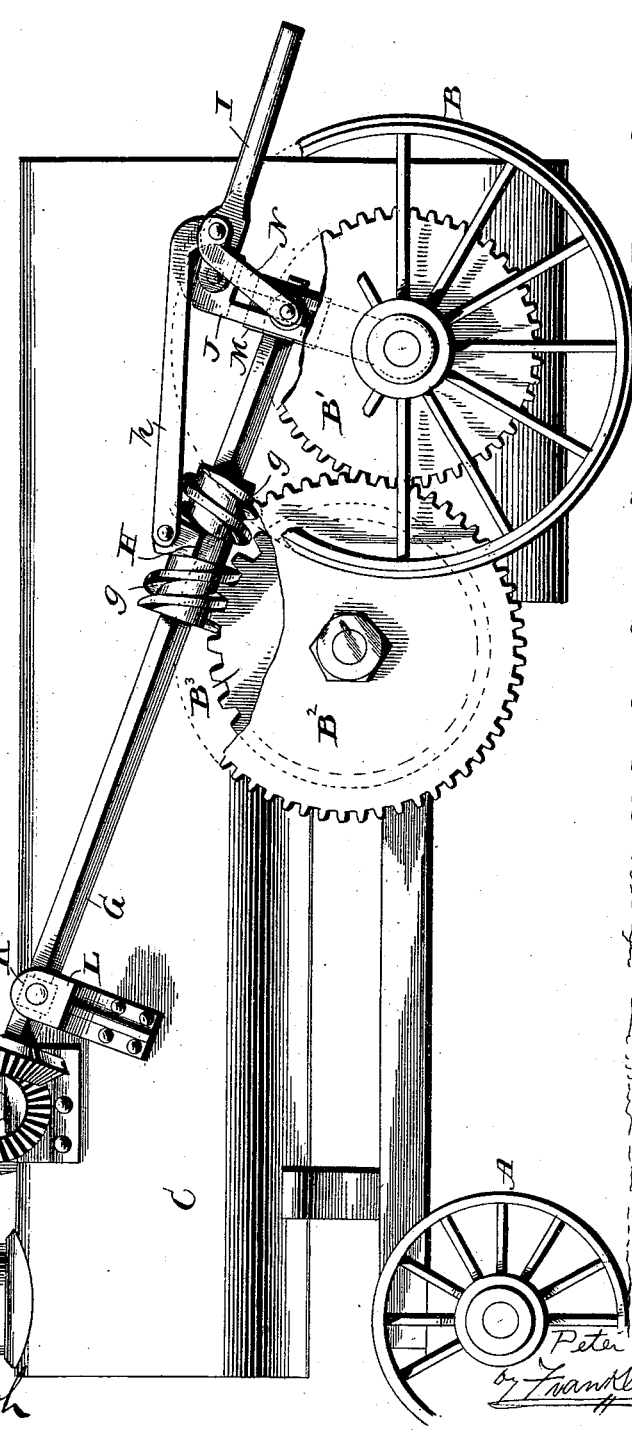

UNITED STATES PATENT OFFICE.

PETER T. NEUMANN, OF GALION, OHIO.

TRACTION-ENGINE.

SPECIFICATION forming part of Letters Patent No. 479,832, dated August 2, 1892.

Application filed April 18, 1892. Serial No. 429,688. (No model.)

*To all whom it may concern:*

Be it known that I, PETER T. NEUMANN, a citizen of the United States, residing at Galion, in the county of Crawford and State of Ohio, have invented certain new and useful Improvements in Traction-Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention aims to provide mechanism for use with steam-engines or other motors which will enable a reversal of the direction of motion of the apparatus driven by the engine to be effected without reversal of the engine itself, and I design my invention for use more especially with traction-engines, so that the same may be moved forward or backward while the motor is being operated continuously in one direction.

To these ends and to such others as the invention may pertain the same consists in the reversing mechanism and the parts thereof, constructed and combined substantially as and for the purpose hereinafter specified.

In the accompanying drawings, Figure 1 shows a traction-engine in side elevation equipped with my invention; Fig. 2, a detail perspective view of my mechanism separated from the engine; and Fig. 3, a detail view, partly in section and partly in side elevation, the operation being indicated in dotted lines.

In the drawings is shown a traction-engine of ordinary construction mounted upon wheels A and B, the latter being the rear wheels and, as usual, the ones to which power is applied to effect the locomotion of the engine. Secured to each wheel, so as to be able to rotate the same, is a gear-wheel B', which meshes with a like wheel $B^2$, mounted on a shaft journaled in front of the wheels B. On said shaft adjacent to the gear $B^2$ is a worm-wheel $B^3$, that is driven in the manner to be described.

Supported in boxes or bearings secured to the upper side of the boiler C, near the front end thereof, is the main shaft D. Said shaft extends crosswise of the boiler, and on one side is connected with any ordinary steam-motor. (Not shown, as the same is of well-known construction and arrangement.) On its other side said shaft has keyed to it a bevel-gear E, that meshes with a bevel-gear F, secured to the front end of a shaft G, that inclines downwardly and rearwardly alongside the boiler. Upon this shaft G is mounted a double screw or worm $g$, one portion of whose thread is right hand and the other left hand, and said screw, by means to be described, is adapted to have one set of threads or the other to mesh with the worm-wheel $B^3$, and so through the gear-wheels $B^2$ and B' drive the wheels B backward or forward. Between the two sets of threads is placed a collar H, which by means of rods or links $h$ $h$ is connected to a pivoted hand-lever I, mounted on a standard J, that is secured to the upper side of the axles of the driving and carrying wheel B on the same side of the machine with the shaft G, of course. Said lever I is designed to slide or shift the dowel-worm along the shaft G, so that one set of threads or the other may be in mesh with the wheel $B^3$. The shaft G may be squared, as shown, or round and the worm splined to it, so that said worm may turn with it whether in one position or the other. In order to slide or shift the worm along the shaft, as described, it of course must be disengaged from the worm-wheel $B^3$, and to accomplish this the following provision is made: Near its front end, quite close to and in rear of the gear F, the shaft G is journaled in a horizontal block or boxing K, whose ends are pivoted in the ears of the bracket L, bolted to the boiler side, so that said shaft is capable of moving vertically, with said boxing as a center of motion. The lower end of the shaft is journaled in a block M, that is placed in a vertical slot formed in the standard J, in which slot it has a certain amount of vertical motion. Such motion is imparted to the shaft, and so it is moved up and down, and the worm accordingly moved out of and into engagement again with its wheel $B^3$ by means of links or rods N, which connect the opposite sides thereof with the two sides of the lever I. Said block has lateral extensions which pass through slots in the sides of the standard J, to which the lower ends of the links N are pivotally attached. The upper ends of the links are connected to the lever at the same point and by the same bolt or pin that secures the links *h h* thereto, and said point is a short distance from the pivot of the lever. The lever I moves through a half or nearly a half circle to shift the worm, and when at either limit of its motion lies substantially parallel with the shaft G. Thus arranged, when moved the first effect of its movement is to turn the shaft G on its pivot-bearing by means of the links N and lift the worm out of mesh with the wheel B, then to shift the worm along the shaft by the links *h h*, and finally move the worm into mesh again with the wheel. Said arrangement of the lever I is also important, in that when at either limit of its motion its pivot, the point of connection of the links *h* with the collar H are in a straight or nearly straight line, so that the worm will practically be locked against accidental movement along its shaft by reason of its engagement with the wheel $B^3$. If desired, a suitable locking device may be employed to supplement this arrangement. Preferably, however, the direction of the thread relative to the position of the lever is such that the thrust upon the worm and so to the lever incident to the resistance of the worm-wheel $B^3$ will tend in a direction the reverse of that necessary to shift the worm from one position to another.

It will be seen from the above description that by my mechanism the direction of rotation of the wheels B may quickly be changed with the main shaft D running continuously in one direction.

Although designed especially for traction-engines, it is to be understood that I do not limit the use of my invention to such, but reserve the right to use it wherever it may be applicable.

Having thus described my invention, what I claim to be new, and desire to secure by Letters Patent, is—

1. In combination with the main shaft of a motor and a worm-wheel, a second shaft driven from said main shaft, the double worm on said second shaft in mesh with said wheel, and means for raising said shaft to lift one part of said worm out of mesh with its wheel and for shifting said worm and then lowering the shaft to place another portion of the worm in mesh with the wheel, substantially as shown and described.

2. In combination with the main shaft of a motor and a worm-wheel, a second shaft driven from said main shaft and journaled at one end in a pivoted box or bearing, the double worm slidable on said second shaft to mesh with said wheel, and the pivoted lever connected to said worm and to its shaft to move the latter on its pivot and to slide the worm, substantially as shown and described.

3. In combination with the main shaft of a motor and a worm-wheel, a second shaft driven from the main shaft, the pivoted box journaling it at one end, the sliding block journaling it at its other, the worm on such second shaft meshing with said wheel, the pivoted lever, and links connecting the same with said worm and with said sliding journaling-block.

4. In combination, the main shaft of a traction-engine, the bevel-gear thereon, the traction-wheel, the worm-wheel geared to the latter, the second shaft having a bevel-gear meshing with the gear of the main shaft, and a double worm to mesh with said worm-wheel, the pivoted box journaling one end of said second shaft, the slidable block journaling the other, and the pivoted lever connected to said block and to said double worm, as shown and described.

5. In combination, the main shaft of a traction-engine, the bevel-gear thereon, the traction-wheel, the worm-wheel geared to the latter, the second shaft having a beveled gear meshing with the gear of the main shaft, the double worm to mesh with said worm-wheel, the collar thereon, the pivoted box journaling one end of said second shaft, the slidable block journaling the other end, the slotted standard in which said block is movable, the lever pivoted to said standard, links connecting said lever, and the collar on the worm, all substantially as shown and described.

In testimony whereof I affix my signature in presence of two witnesses.

PETER T. NEUMANN.

Witnesses:
SYLVESTER PRICE,
JULIUS BRACHER.